May 12, 1964  H. DOMINES  3,132,823
VEHICLE WINCH
Filed July 21, 1961  2 Sheets-Sheet 1
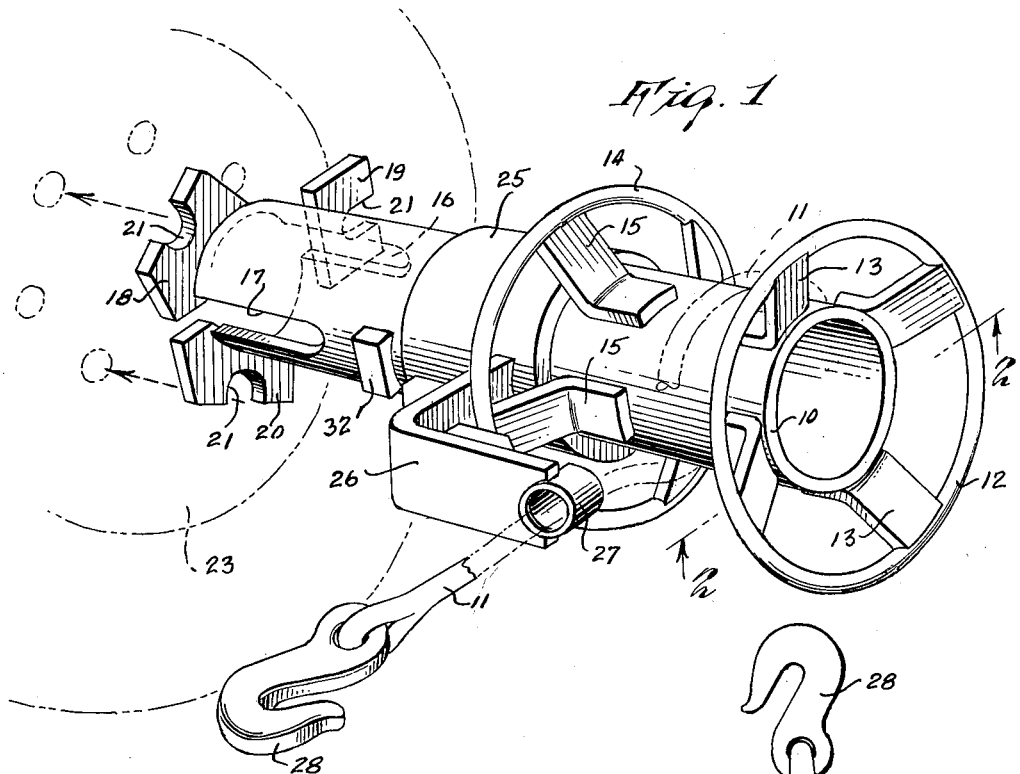
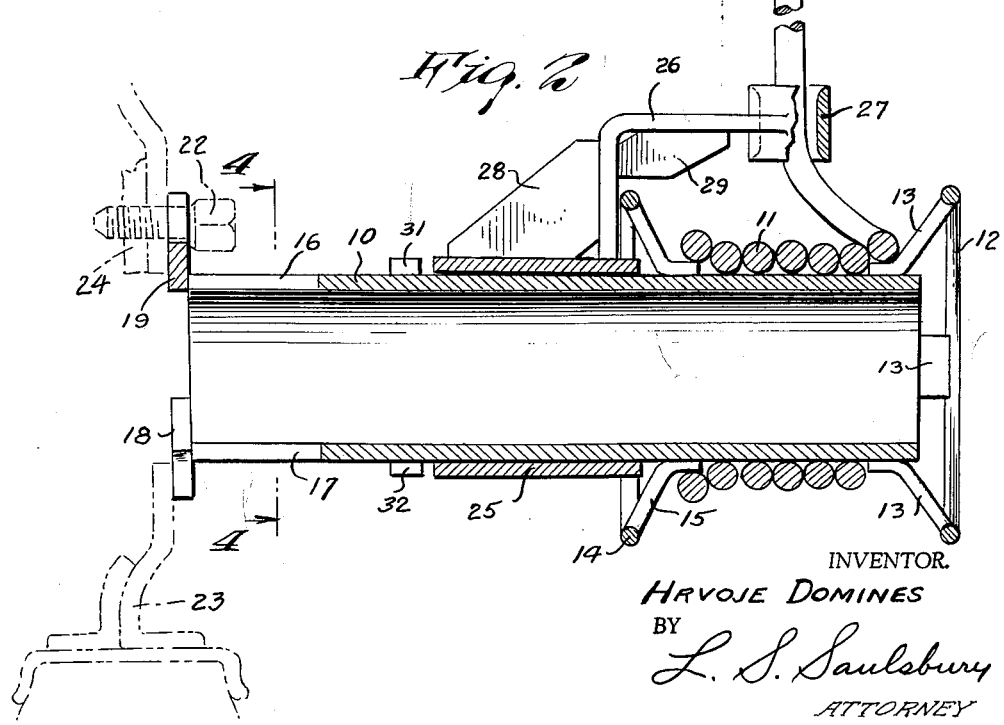
INVENTOR.
HRVOJE DOMINES
BY
L. S. Saulsbury
ATTORNEY May 12, 1964     H. DOMINES     3,132,823
VEHICLE WINCH
Filed July 21, 1961     2 Sheets-Sheet 2
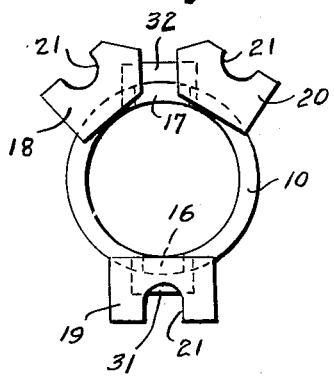
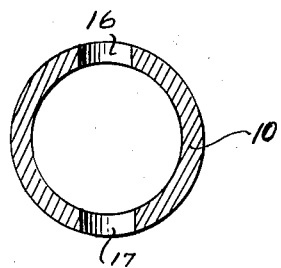
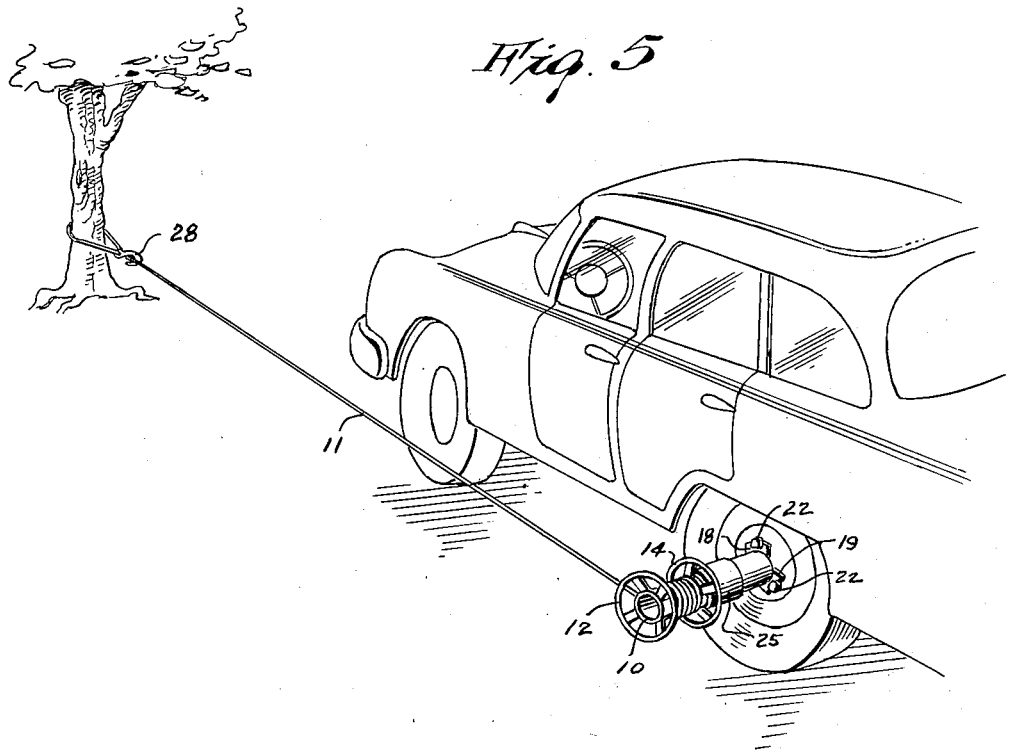
HRVOJE DOMINES, INVENTOR.

United States Patent Office 3,132,823
Patented May 12, 1964

3,132,823
VEHICLE WINCH
Hrvoje Domines, 1436 N. 21st St., Apt. 1,
Milwaukee, Wis.
Filed July 21, 1961, Ser. No. 125,841
1 Claim. (Cl. 242—95)

This invention relates to a vehicle winch adapted to be driven by the rear wheel of the vehicle.

It is the principal object of the present invention to provide a vehicle winch that can be easily connected to the rear wheel of the vehicle and powered thereby, simply by removing the hub cap, loosening the bolts that hold the rim of the tire to the wheel, and slipping the attaching portions of the winch under the bolts, the attaching portions being so shaped and arranged that they can be readily accommodated to the loosened bolts without the necessity of having to remove the bolts.

It is another object of the invention to provide a vehicle winch that can be connected to the rear wheel of a vehicle to be driven by the same that has a cable winding structure that can be turned on the main drum sleeve to wind the cable thereupon without having to turn the vehicle wheel, this being done when it is desired to tighten the cable or wind up the same and to allow any guide the cable on being payed out for connection to a tree or other fixed object toward which the vehicle is to be pulled to free it of snow, water, sand, very muddy or rough terrain.

It is still another object of the invention to provide a vehicle winch that comprises a main drum sleeve that is simply attached to the vehicle rear wheel by the tire rim bolts and that has a wheel handle that can be used for turning the vehicle wheel when it can easily slip for a certain amount of tightening of the cable and a second and opposing wheel handle on the drum sleeve wherein the wheel handles will serve to confine the cable to the outer end of the main drum sleeve and free of entanglement with the vehicle wheel as the drum sleeve is turned by the vehicle wheel.

Other objects of the invention are to provide a vehicle winch which is of simple construction, has a minimum number of parts, easy to assemble, inexpensive, compact, durable, rugged, yet light in weight, will withstand large strain, easily stored in vehicle trunk, efficient and effective in use.

For a better understanding of the invention, reference may be had to the following detailed description taken in connection with the accompanying drawing, in which FIGURE 1 is a perspective view of the vehicle winch embodying the features of the present invention with illustration being made as to the manner in which the same may be attached to a vehicle wheel bolt, FIG. 2 is a longitudinal sectional view of the vehicle winch attached to the vehicle wheel and as viewed generally on line 2—2 of FIG. 1, FIG. 3 is a fragmentary end elevational view looking upon the front face of the attaching bracket portions by which the winch is secured to the bolts of the vehicle wheel, FIG. 4 is a fragmentary transverse sectional view of the main drum sleeve looking into the weakening slots as viewed on line 4—4 of FIG. 2, and FIG. 5 is a perspective view of a vehicle with the vehicle winch attached to the rear wheel thereof and its cable connected to the tree, thereby illustrating the manner in which the winch is used to pull the vehicle toward the tree and from the ground obstacle and upon power being applied to the vehicle rear wheel.

Referring now to the figures, 10 represents a main drum sleeve of sufficient length to receive and wind up a cable 11 distributed over its outer end and against a wheel handle cable guide 12 that is made secure to the sleeve by welding, rivets or in any suitable manner of its spoke arms 13 that are inclined inwardly from the wheel handle cable guide 12 and over which the cable is built up as it is wound upon the main drum sleeve. These spokes 13 are inclined from the connection with the end of the drum sleeve upwardly and outwardly to obtain on their outer ends the wheel handle cable guide 12.

Inwardly spaced from the wheel handle cable guide 12 is a wheel handle cable guide 14 that is similarly connected by opposingly inclined spoke arms 15 to the drum sleeve 10 and against which the cable 11 is also built up as the drum sleeve is turned. The end of the cable 11 may be fixed to the drum by any suitable fastening device or simply wrapped a few turns about the drum to sustain it for the beginning of the pulling operation.

The inner end of the drum sleeve 10 has diametrically-opposing weakening slots 16 and 17 to give springness to the sleeve end and rigidly secured to the inner end face of the sleeve 10 outwardly of the slots 16 and 17 are three flush attaching plate portions 18, 19 and 20 which respectively have open recesses or notches 21 for receiving three of the vehicle six tire rim attaching bolts 22 sixty degrees apart that pass through the tire rim 23 and into the wheel of the vehicle as shown at 24. The slots 16 and 17 will give somewhat of a contraction in order that the attaching plate portions can be better accommodated to the bolts 22. The attaching portions 18 and 20 lie at the opposite sides of the slot 17 while the attaching plate portion 19 spans the slot 16.

Journalled upon the main drum sleeve 10 is a second sleeve 25 that carries a cable guide arm 26 that extends radially-outwardly and longitudinally and has a radially-extending guide sleeve portion 27 through which the cable 11 extends and on which is a hook 28. The cable guide arm 26 is reinforced in its attachment with the sleeve 25 by a radially-extending gusset 28 welded or otherwise suitably secured between the second sleeve 25 and cable guide arm 26. The guide arm is also reinforced by an inside gusset 29 secured within the corner bend of the guide arm. The projections 31 and 32 hold the second sleeve against inward displacement but allowing for some movement.

When the vehicle has been stalled and unable to overcome the obstacle in the road, such as snow, water, sand, mud or rough terrain, the vehicle winch is taken from the trunk of the vehicle where it has been conveniently stored. It is preferably made of aluminum and light in weight. The hub cap of the vehicle wheel is removed and three of the tire rim screws are loosened only sufficiently to allow the notches 21 of the attaching plates 18, 19 and 20 to be disposed under the heads of the bolts 22 and the attaching plate portions brought flush against the tire rim 23. The single attaching portions 19 may be first located on a loose bolt 22 and then the two attaching portions are brought into engagement with two adjacent loose bolts 22 and because of the weakening slot 17 they can flex slightly to accommodate themselves over the bolts 22. The tire rim bolts 22 are then tightened home by a tire bolt wrench with the weakening slots 16 and 17 giving, if necessary, to permit the bolts to be tightened.

The cable 11 can then be payed out so that its free end can be passed about a tree and the hook 28 engage with the cable to fix the cable thereby to the tree, as best illustrated in FIG. 5. Since the rear drive wheel is caused to spin or have insufficient power to overcome the obstacle, the cable upon the engine of the vehicle being operated to drive the wheels of the vehicle will be tightened and be wound slowly upon the main drum sleeve 10 of the winch so that the vehicle will thereby pull itself out of the hole or over the obstacle. The guide sleeve 25 will turn on the drum sleeve 10 so that the guide sleeve portion 27 can accommodate itself to the direction of the cable effected by the strain thereupon. The guide arm 26 when the cable is set free of the tree can also be turned upon the drum sleeve 10 to wind up the cable 11 upon the drum sleeve 10 with the opposing wheel handles and spokes serving to confine the cable to the outer end of the drum sleeve 10.

After the vehicle has been pulled out of the hole and the user has no longer any need for the winch, the obstacle having been overcome, the bolts are thereafter tightened and the hub cap is again secured upon the wheel. The vehicle winch can again be stored in the trunk and made available for use when the vehicle again becomes stalled and unable to counter an obstacle.

While various changes may be made in the detail construction, it should be understood that such changes shall be within the spirit and scope of the present invention as defined by the appended claim.

What is claimed is:

A vehicle wheel winch comprising in combination a main drum sleeve, a wheel handle cable guide at one end of said drum sleeve, said guide including an annular wheel handle and outwardly inclined spokes, a second wheel handle cable guide identical to but oppositely inclined relative to said first mentioned guide secured to an intermediate portion of said drum sleeve, a second sleeve mounted on said drum sleeve, said drum sleeve being freely rotatable relative to said second sleeve, positioned between said second wheel handle guide and the other end of said drum sleeve, projections on said drum sleeve permitting limited axial movement of said second sleeve on said drum sleeve, a cable guide arm having a longitudinally extending portion terminating between said wheel handle guides secured to said second sleeve, a radially extending gusset secured between said second sleeve and said guide arm, a guide sleeve portion secured to said longitudinally extending portion of said guide arm and extending radially relative to said drum sleeve adapted to accommodate and guide a cable wound about said drum sleeve between said wheel handle guides, said drum sleeve having diametrically opposed open ended weakening slots adjacent said other end of said drum sleeve, a first attaching plate portion having an open semi-circular notch in its outer edge extending radially from said drum sleeve and spanning one of said weakening slots, a pair of additional attaching plates, each having a semi-circular notch in its outer edge positioned on opposite sides of the other of said weakening slots, said notches being adapted for engagement with alternate tire rim attaching bolts, said weakening slots permitting limited compression of said drum sleeve to allow said notches to engage the bolts without complete removal of the bolts.

References Cited in the file of this patent
UNITED STATES PATENTS

| | | |
|---|---|---|
| 1,834,159 | King et al. | Dec. 1, 1931 |
| 1,834,993 | Atwood | Dec. 8, 1931 |
| 1,837,583 | Powers | Dec. 22, 1931 |
| 1,892,785 | Keiser | Jan. 3, 1933 |
| 1,934,176 | Elssner et al. | Nov. 7, 1933 |
| 2,537,522 | Fries et al. | Jan. 9, 1951 |
| 2,571,321 | Wettley | Oct. 16, 1951 |
| 2,642,235 | Smith | June 16, 1953 |